United States Patent
Tsai et al.

(10) Patent No.: US 8,856,558 B2
(45) Date of Patent: Oct. 7, 2014

(54) ELECTRONIC APPARATUS HAVING STAND-BY MODE AND OPERATION METHOD THEREOF

(75) Inventors: Chih-Fu Tsai, Kaohsiung County (TW); Jia-Ching Shen, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 679 days.

(21) Appl. No.: 13/168,127

(22) Filed: Jun. 24, 2011

(65) Prior Publication Data

US 2011/0316517 A1     Dec. 29, 2011

(30) Foreign Application Priority Data

Jun. 25, 2010   (TW) .............................. 99120750 A

(51) Int. Cl.
*H02J 9/00*       (2006.01)
(52) U.S. Cl.
CPC ..................................... *H02J 9/005* (2013.01)
USPC ......................................... 713/300; 713/323
(58) Field of Classification Search
USPC ......... 713/1, 2, 100, 300, 310, 320, 321, 322, 713/323, 324, 330, 340, 375
See application file for complete search history.

(56) References Cited

U.S. PATENT DOCUMENTS

| | | | |
|---|---|---|---|
| 7,962,921 B2 * | 6/2011 | James et al. | 719/318 |
| 2006/0040715 A1 | 2/2006 | Chen et al. | |
| 2007/0106920 A1 * | 5/2007 | Lee et al. | 713/320 |
| 2009/0313492 A1 * | 12/2009 | Lerman | 713/323 |

FOREIGN PATENT DOCUMENTS

| | | |
|---|---|---|
| CN | 1245931 A | 3/2000 |
| CN | 101013340 A | 8/2007 |
| CN | 101807106 A | 8/2010 |
| TW | 200825706 A | 6/2008 |
| TW | 201007442 A | 2/2010 |
| TW | 201014141 A1 | 4/2010 |

OTHER PUBLICATIONS

State Intellectual Property Office of the People's Republic of China, "Office Action", China, Jan. 6, 2014.
Intellectual Property Office, Ministry of Economic Affairs, R.O.C., "Office Action", May 27, 2013, Taiwan.

* cited by examiner

*Primary Examiner* — Mark Connolly
*Assistant Examiner* — Paul J Yen
(74) *Attorney, Agent, or Firm* — Morris Manning & Martin LLP; Tim Tingkang Xia, Esq.

(57) ABSTRACT

An electronic apparatus has a stand-by mode. The electronic apparatus includes a first circuit, a second circuit and a third circuit. The first circuit has an interface and transfers data to an external device. The second circuit has a processor and sets a first power supplying mode of the first circuit. The third circuit sets a second circuit power supplying mode of the second circuit and sets a second power supply mode of the first circuit when the second circuit is disabled. The processor selects a first circuit power supplying mode from power supplying modes of the first circuit as the second power supplying mode before the second circuit is disabled.

13 Claims, 7 Drawing Sheets

ELECTRONIC APPARATUS HAVING STAND-BY MODE AND OPERATION METHOD THEREOF

CROSS-REFERENCE TO RELATED APPLICATION

This non-provisional application claims priority under 35 U.S.C. §119(a) on Patent Application No. 099120750 filed in Taiwan (R.O.C.) on Jun. 25, 2010, the entire contents of which are hereby incorporated by reference.

BACKGROUND OF THE INVENTION

1. Field of the invention

The present invention relates to an electronic apparatus having stand-by mode and operation method thereof, more particularly, an electronic apparatus having two stand-by modes respectively including different characters and the operation methods thereof.

2. Description of the Prior Arts

On the premise of environment protection, it is important for saving energy in modern electrical equipment. The using time of the battery is generally decided by the normal operation of the elements, and power consumption and efficiency of stand-by mode, so the different operations and stand-by modes are applied in actual design according to the system requirement for decreasing power consumption. For example, wireless application has one or more settings, such as Quiet Mode, Sleep Mode, Power down Mode, Card Disable, Radio Off, and so on. Therefore, how to save energy in the stand-by mode is an issue worth of research.

The general stand-by modes are divided to two types as follows:

(1) The stand-by mode is set by the built-in or external software driving processor. In other word, the stand-by mode triggered condition is firstly set by the system, and then the stand-by mode is set by the external software or built-in firmware when the stand-by mode triggered condition is satisfied. However, the operated processors are required to stay on whether the software or firmware is used, and these processor themselves must waste a large amount of energy. Hence, this way is not economical.

(2) The external pin is triggered. In other words, the stand-by mode is set by the specific hardware. However, the specific hardware is only used in the limit and fixed stand-by mode, and different stand by modes respectively need to be triggered by different pins. With the chip area and the number of pins are decreased, it is not an economical method of using many pins to set these stand-by modes.

Accordingly, in view of the above drawbacks, the present invention provides an electronic apparatus having stand-by mode and operation method thereof, more particularly, an electronic apparatus having two stand-by modes respectively including different characters and the operation methods thereof for improving the drawbacks, such as too many pins or wasting much energy in the conventional stand-by mode.

SUMMARY OF THE INVENTION

In view of the disadvantages of prior art, the primary object of the present invention provides an apparatus or method for decreasing the power consumption of stand-by mode and the number of pins required by the stand-by mode.

According to one embodiment, the present invention provides an electronic apparatus having stand-by mode, which comprises: a first circuit, comprising an interface and transferring data with an external device; a second circuit, comprising a processor and setting a first power supplying mode of the first circuit; and a third circuit, setting a second circuit power supplying mode of the second circuit and setting a second power supplying mode of the first circuit when the second circuit is disabled; wherein the processor selects a first circuit power supplying mode from power supplying modes of the first circuit as the second power supplying mode before the second circuit is disabled.

According to another embodiment, the present invention provides a method of setting electronic apparatus having stand-by mode, which comprises: supplying power to the electronic apparatus; providing a plurality of power supplying modes of the electronic apparatus; selecting a second power supplying mode from the plurality of power supplying modes by a processor in the electronic apparatus according to the mode of electronic apparatus; and shutting down the power of the processor.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the detailed description given herein below and the accompanying drawings which are given by way of illustration only, and thus are not limitative of the present invention and wherein.

DESCRIPTION OF THE EXEMPLARY EMBODIMENTS

The following descriptions are of exemplary embodiments only, and are not intended to limit the scope, applicability, or configuration of the invention in any way. Rather, the following description provides a convenient illustration for implementing exemplary embodiments of the invention. Various changes to the described embodiments may be made in the function and arrangement of the elements described. For your esteemed members of reviewing committee to further understand and recognize the fulfilled functions and structural characteristics of the invention, several exemplary embodiments cooperating with detailed description are presented as the follows.

Figure 1:
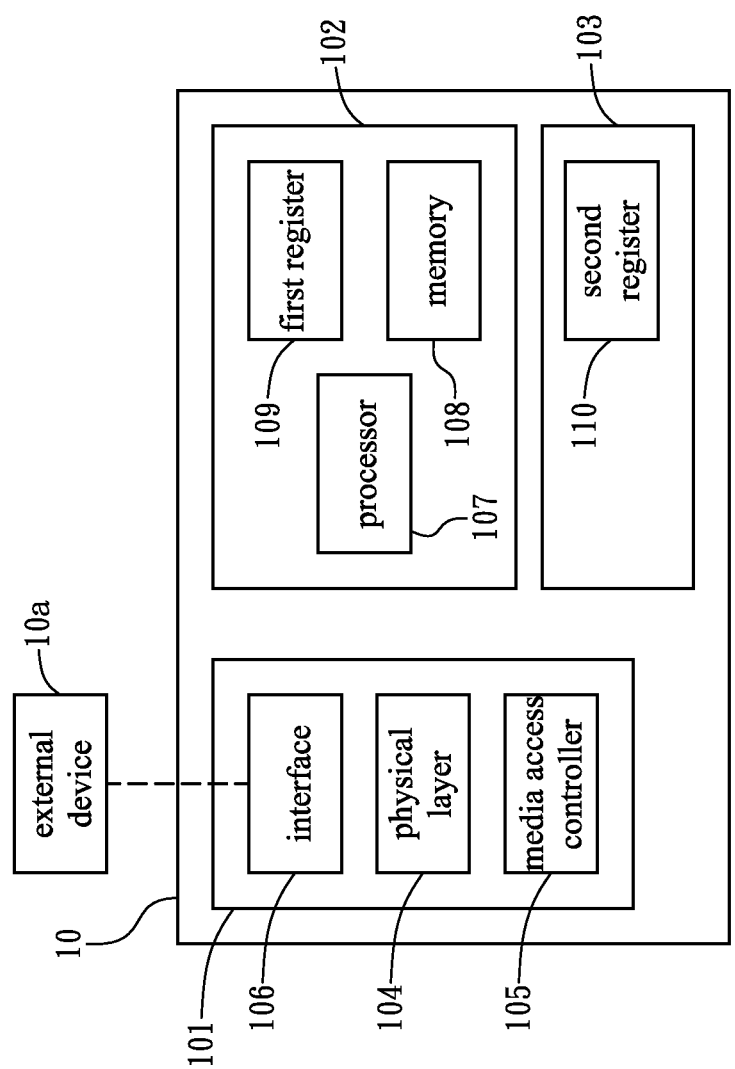
FIG. 1 illustrates a schematic diagram of an electronic apparatus having stand-by mode of the present invention.

FIG. 1 illustrates an electronic apparatus 10 having stand-by mode according to one embodiment of the present invention. The electronic apparatus 10 includes a first circuit 101 including an interface 106 and transferring data to an external device 10*a*; a second circuit 102 including a processor 107 and setting a first power supplying mode of the first circuit 101; and a third circuit 103 setting a second circuit power supplying mode of the second circuit 102 and setting a second power supplying mode of the first circuit 101 when the second circuit 102 is disabled. In accordance with one embodiment of the present invention, an appropriate power supplying mode or stand-by mode is selected out from a plurality of power supplying modes based on the mode of the electronic apparatus 10, for example, the operation situations or external instructions of the first and second circuits 101, 102, and the triggered condition and function of the external pin (not shown in) are set according to the appropriate power supplying mode or stand-by mode or an appropriate triggered condition selected out from a plurality of triggered conditions is determined as an triggered condition of the external pin. Wherein the external pin may be, for example, a multi-function general purpose I/O (GPIO) pin. Subsequently, the power of the processor is shut down to save energy and the triggered conditions of stand-by mode/power supplying mode are set as unfixed, and the triggered condition is selected by the processor according to the state before shutting down so as to achieve a purpose of using single pin to select the functions of many triggered conditions.

Preferably, the electronic apparatus 10 is a system-on-a-chip.

Preferably, the first circuit 101 further includes a physical layer 104 and a media access controller 105.

Preferably, the second circuit 102 further includes a memory 108 cooperated operation with the processor 107, and further includes a first register 109 for storing the power supplying mode of the first circuit 101.

Preferably, the third circuit 103 further includes a second register 110 for storing the power supplying modes of the first circuit 101 and the second circuit 102.

FIG. 2A-2E further illustrates when the electronic apparatus 10 having stand-by mode is a wireless card, the power supplying modes of the electronic apparatus 10 may include some embodiments as follows, but not limited.

Figure 2A:
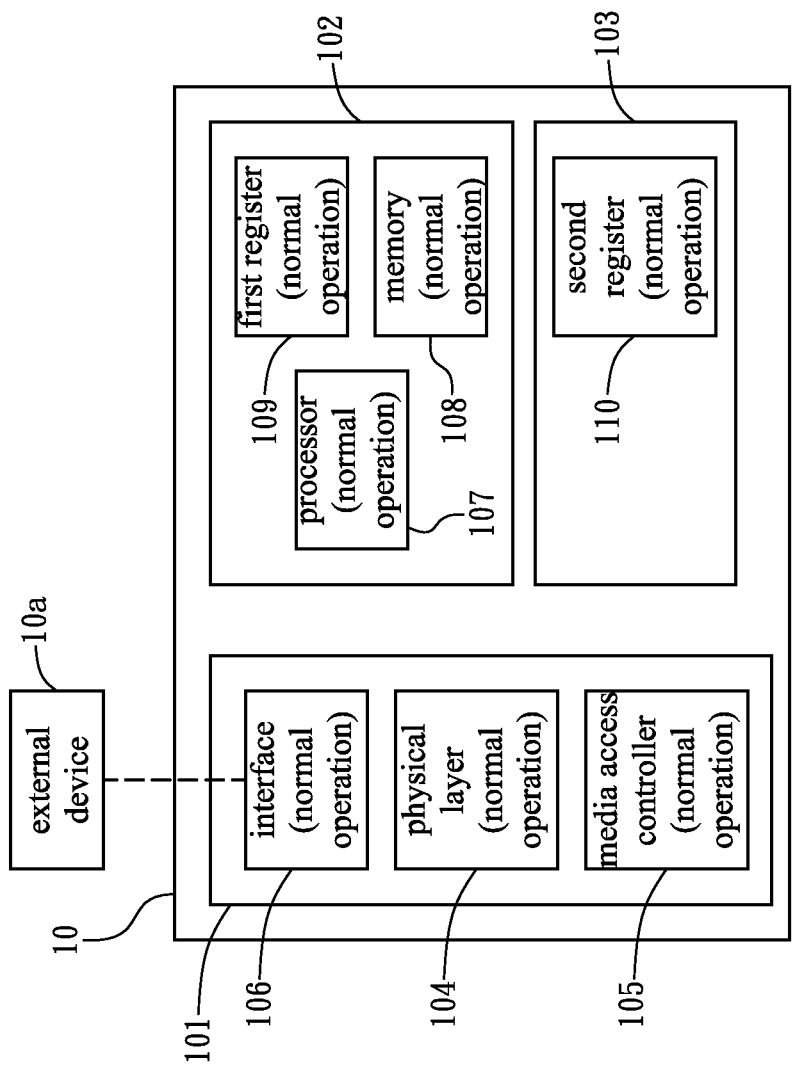
FIG. 2A-2E illustrate schematic diagrams of electronic apparatus having stand-by modes of present invention.

FIG. 2A is a normal operation mode, showing that the first circuit 101, the interface 106, the second circuit 102 and the third circuit 103 all enter into the operation mode. In other words, the second circuit 102 set the power supplying mode of the first circuit 101 as normal operation. Meanwhile, the processor 107 is driven by the firmware or software to set the stand-by mode or power supplying mode so as to change operation mode of the first circuit 101.

Figure 2B:
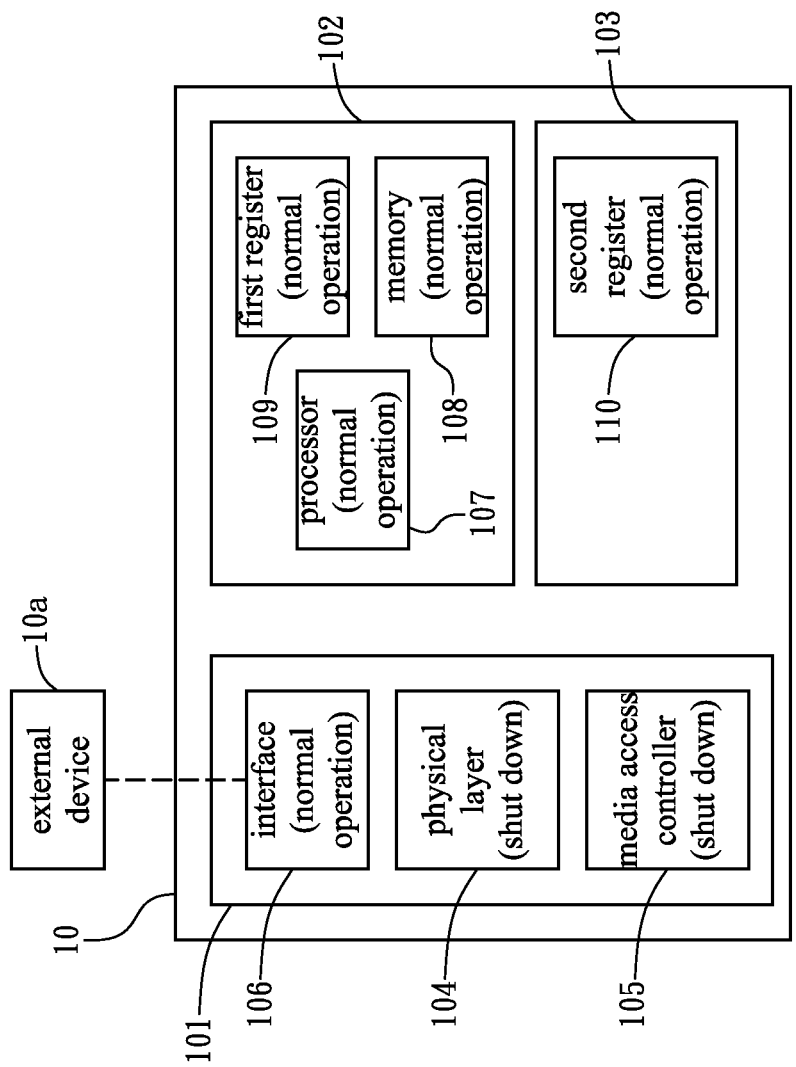

FIG. 2B is Radio Off mode, showing the power of the physical layer 104 and media access controller 105 in the first circuit 101 are shut down, and the second circuit 102, the interface 106 of the first circuit 101 and the third circuit 103 still enter into operation mode, and the second circuit 102 receives the indication from the external device 10a to immediately turn on the power of the first circuit 101. This is to say, the processor 107 is driven by the firmware or software to set the stand-by mode. Further, the stand-by mode triggered condition of a first register 109 is first set by the electronic apparatus 10, and the processor 107 is driven by the software or firmware to set the stand-by mode or the power supplying mode when the triggered conditions are satisfied.

Figure 2C:
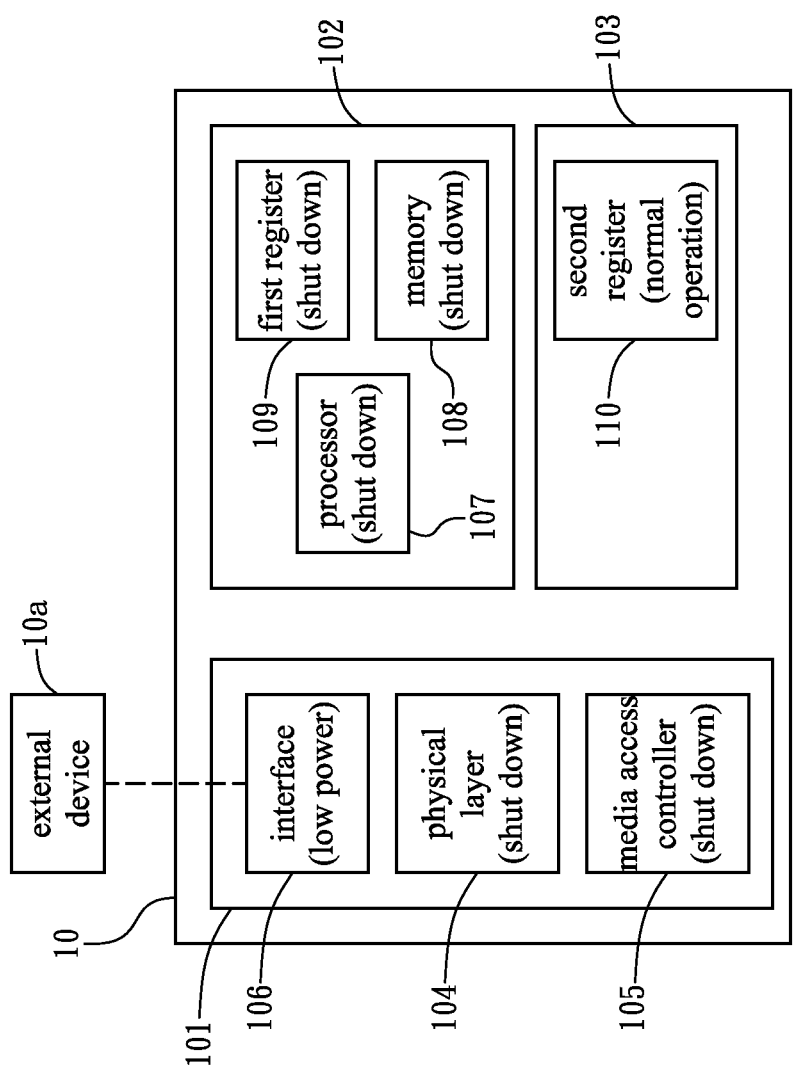

FIG. 2C is Card Disable mode, showing the powers of the physical layer 104 in the first circuit 101 and the media access controller 105 are shut down. In the present invention, the power of the second circuit 102 (the power of the processor 107) is shut down, but the interface 106 enters into low power mode (for example SUS/L3) and the third circuit 103 keeps in operation mode. The second circuit 102 can set the second register 110 of the third circuit 103 before the power of the second circuit is shut down. In other words, the processor 107 selects an appropriate the power supplying mode from the plurality of power supplying modes as the power supplying mode of the electronic apparatus 10 (or the first circuit 101) according to the situation of the electronic device 10, for example, the operation situation of each circuit and the succeeding operation evaluated will be occurred. Meanwhile, for example, the external device 10a transfers the specific external instruction via the interface 106 for enabling the power of the processor 107 again, or transferring the specific data.

Figure 2D:
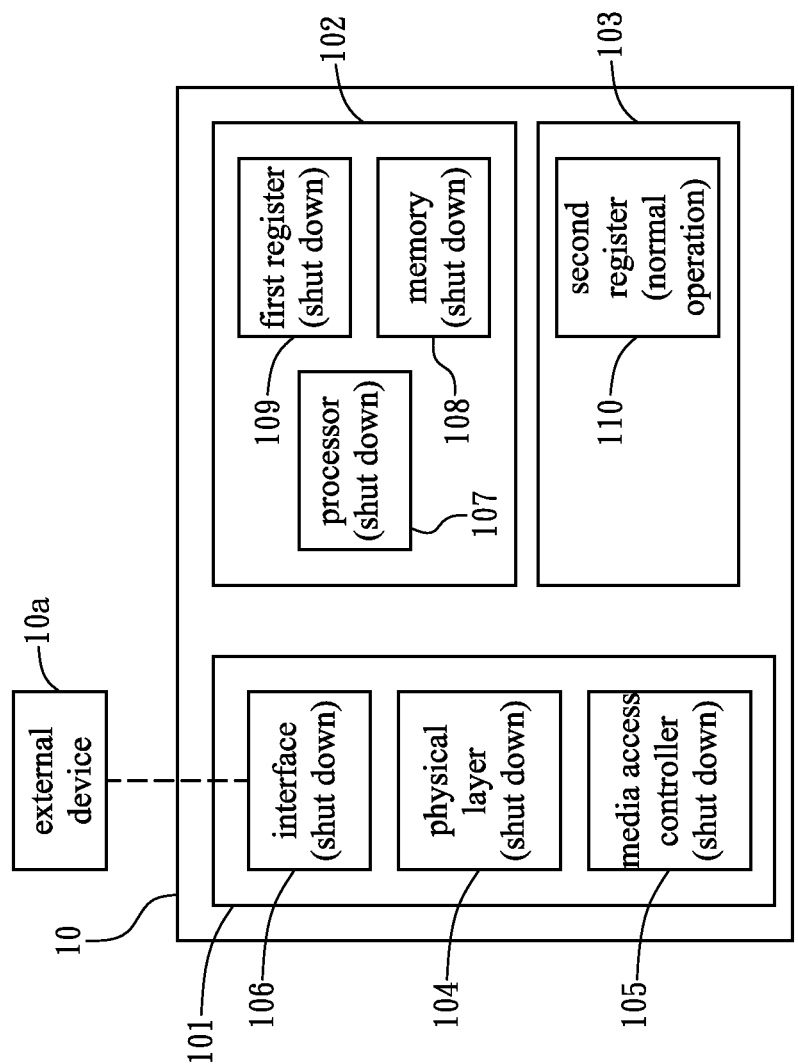

FIG. 2D is triggered mode of the external pin, showing the powers of the first and second circuits 101, 102 are shut down, but the third circuit 103 keeps in operation mode. Wherein the third circuit 103 is triggered by the external pin and the stand-by mode or power supplying mode of the third circuit 103 is set by the specific hardware. However, the processor 107 will firstly set the second register 110 of the third circuit 103 before the second circuit 102 is shut down. Further, the processor 107 selects an appropriate power supplying mode from the plurality of power supplying modes according to the situation of the electronic apparatus 10 for setting the triggered conditions and function of stand-by mode of the external pin (not shown in), or the processor 107 selects an appropriate triggered condition from plurality of triggered conditions as the triggered condition of the external pin.

Figure 2E:
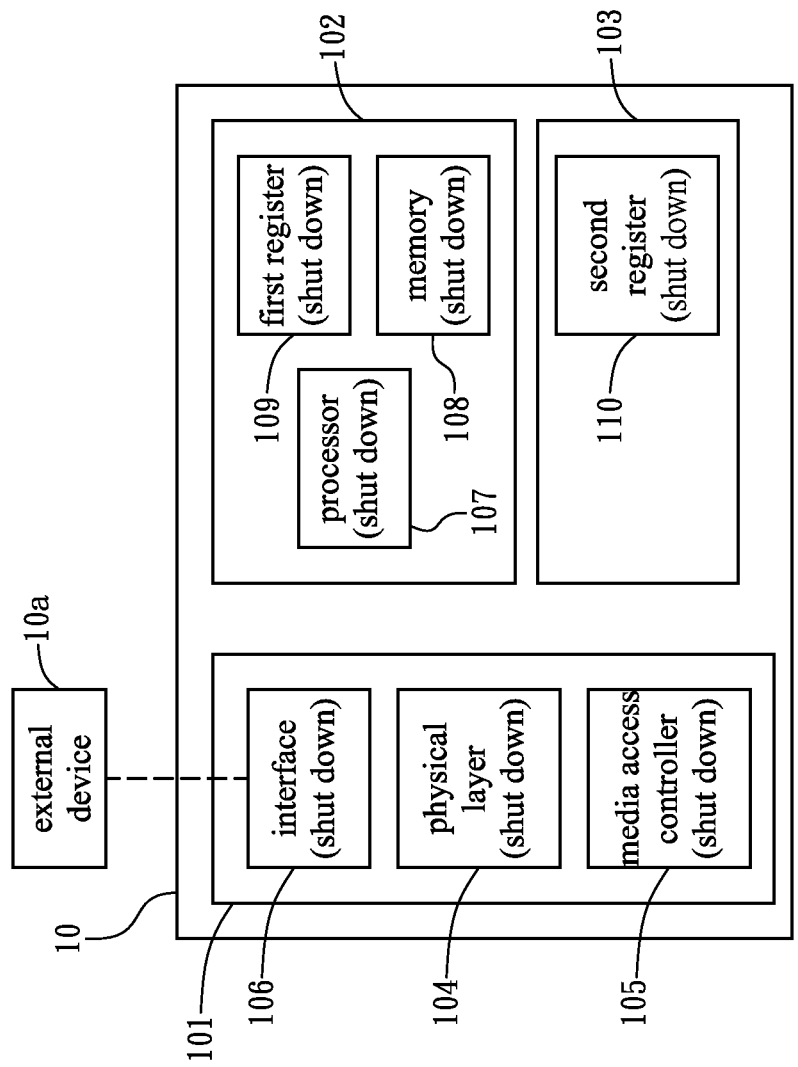

FIG. 2E is Power Down mode, showing the powers of the first circuit 101, the second circuit 102, the interface 106 and the third circuit 103 are shut down.

Figure 3:
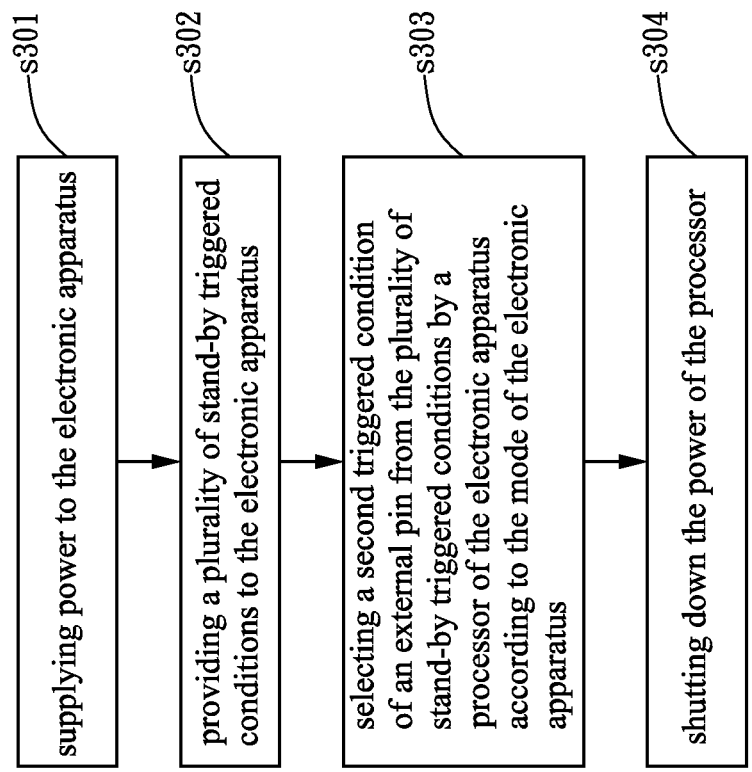
FIG. 3 illustrates a flow chart showing a method of setting the stand-by mode of the present invention.

FIG. 3 illustrates a method of flow chart of present invention related to a method for setting the stand-by mode of an electronic apparatus. The method includes the steps as follows:

s301: supplying power to the electronic apparatus;
s302: providing a plurality of stand-by triggered conditions to the electronic apparatus;
s303: selecting a second triggered condition of an external pin from the plurality of stand-by triggered conditions by a processor of the electronic apparatus according to the mode of the electronic apparatus; and
s304: shutting down the power of the processor.

Preferably, as shown in the method of FIG. 3, the step of selecting a second power supplying mode further includes: setting a triggered condition of an external pin according to the second power supplying mode, and the electronic apparatus 10 further includes an interface 106 and a the third circuit 103, wherein the third circuit 103 enables the second power supplying mode according to the external pin triggered when the power of the interface 106 is also shut down.

Preferably, the electronic apparatus includes an interface, which operates according to the second power supplying mode when the power of the processor is shut down.

Preferably, as shown in the method of FIG. 3, the step further includes: setting the power supplying mode of the electronic apparatus by a third circuit in the electronic apparatus according to the second power supplying mode, and the third circuit further includes a second register for storing the second power supplying mode.

The invention being thus aforesaid, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An electronic apparatus having stand-by mode, comprising:
a first circuit having a plurality of first power supply modes, and comprising an interface and transferring data to an external device;

a second circuit having a plurality of second power supply modes, and comprising a processor and a first register; and a third circuit, comprising a second register, wherein when the second circuit is powered on:
the processor sets the first circuit with one of the first power supplying modes;
the first register stores the one of the first power supplying modes; and
the third circuit sets the second circuit with one of the second power supplying modes; and wherein when the second circuit is powered off:
the processor sets the second register before the second circuit is powered off, such that the second register stores another of the first power supplying modes and another of the second power supply modes; and
the third circuit sets the first circuit with the another of the first power supplying modes and sets the second circuit with the another of the second power supplying modes.

2. The electronic apparatus as recited in claim 1, wherein the third circuit sets a triggered condition of an external pin according to the another of the first power supplying modes.

3. The electronic apparatus as recited in claim 2, wherein the third circuit enables the second power supplying mode according to the external pin triggered when the first and second circuits are both disabled.

4. The electronic apparatus as recited in claim 1, wherein the third circuit sets a triggered condition of an external pin according to the another of the second power supplying modes.

5. The electronic apparatus as recited in claim 4, wherein the third circuit enables the another of the second power supplying modes according to the external pin triggered when the first and second circuits are both disabled.

6. The electronic apparatus recited in claim 1, wherein the first circuit further comprises a physical layer and a media access controller, wherein the interface are operated according to the another of the first power supplying modes when powers of the physical layer, the media access controller and the second circuit are shut down.

7. A method of setting an electronic apparatus having stand-by mode,
wherein the electronic apparatus comprises:
a first circuit having a plurality of first power supply modes, and comprising an interface and transferring data to an external device;
a second circuit having a plurality of second power supply modes, and comprising a processor and a first register; and
a third circuit, comprising a second register, wherein when the second circuit is powered on:
the processor sets the first circuit with one of the first power supplying modes;
the first register stores the one of the first power supplying modes; and
the third circuit sets the second circuit with one of the second power supplying modes; and wherein when the second circuit is powered off:
the processor sets the second register before the second circuit is powered off, such that the second register stores another of the first power supplying modes and another of the second power supply modes; and
the third circuit sets the first circuit with the another of the first power supplying modes and sets the second circuit with the another of the second power supplying modes; and wherein the method comprises:
supplying power to the electronic apparatus;
providing a plurality of power supplying modes of the electronic apparatus, wherein each of the plurality of power supplying modes comprises one of the first power supply mode of the first circuit and one of the second power supply mode of the second circuit;
selecting a power supplying mode from the plurality of power supplying modes by a processor in the electronic apparatus according to the mode of the electronic apparatus; and
shutting down the power of the processor.

8. The method as recited in claim 7, the step of selecting a power supplying mode further comprises:
setting a triggered condition of an external pin according to the power supplying mode.

9. The method as recited in claim 8, wherein the third circuit enables the power supplying mode according to the external pin triggered when the power of the interface is shut down.

10. The method as recited in claim 7, further comprising:
setting the power supplying mode of the electronic apparatus by the third circuit according to the power supplying mode.

11. The method as recited in claim 7, wherein the interface is operated according to the power supplying mode when the power of the interface is shut down.

12. A method of setting an electronic apparatus having stand-by mode,
wherein the electronic apparatus comprises:
a first circuit having a plurality of first power supply modes, and comprising an interface and transferring data to an external device;
a second circuit having a plurality of second power supply modes, and comprising a processor and a first register; and
a third circuit, comprising a second register, wherein when the second circuit is powered on:
the processor sets the first circuit with one of the first power supplying modes;
the first register stores the one of the first power supplying modes; and
the third circuit sets the second circuit with one of the second power supplying modes; and wherein when the second circuit is powered off:
the processor sets the second register before the second circuit is powered off, such that the second register stores another of the first power supplying modes and another of the second power supply modes; and
the third circuit sets the first circuit with the another of the first power supplying modes and sets the second circuit with the another of the second power supplying modes; and wherein the method comprises:
supplying power to the electronic apparatus;
providing a plurality of stand-by triggered conditions to the electronic apparatus;
selecting a triggered condition of an external pin from the plurality of stand-by triggered conditions by a processor of the electronic apparatus according to the mode of the electronic apparatus; and
shutting down the power of the processor.

13. The method as recited in claim 12, further comprising:
enabling the processor by the third circuit of the electronic apparatus when the triggered condition of the external pin is occurred.

* * * * *